United States Patent [19]

Tanaka

[11] Patent Number: 5,703,659
[45] Date of Patent: Dec. 30, 1997

[54] METHOD OF REDUCING AND MAGNIFYING PICTURE SIZE OF A VIDEO COMPOSITE SIGNAL

[75] Inventor: Kazuyoshi Tanaka, Tokyo, Japan

[73] Assignee: NEC Corporation, Tokyo, Japan

[21] Appl. No.: 617,402

[22] Filed: Mar. 19, 1996

Related U.S. Application Data

[63] Continuation-in-part of Ser. No. 534,746, Sep. 27, 1995, abandoned, which is a continuation of Ser. No. 262,438, Jun. 20, 1994, abandoned.

[30] Foreign Application Priority Data

Jun. 21, 1993 [JP] Japan ................................ 5-172135

[51] Int. Cl.⁶ ............................. H04N 9/74; H04N 9/64
[52] U.S. Cl. ....................... 348/576; 348/562; 348/582
[58] Field of Search ........................... 348/561, 562, 348/240, 576, 581, 582, 704; H04N 9/74, 9/64

[56] References Cited

U.S. PATENT DOCUMENTS

| | | | |
|---|---|---|---|
| 4,689,660 | 8/1987 | Kashigi | 358/11 |
| 5,065,230 | 11/1991 | Kumano | 348/582 |
| 5,396,298 | 3/1995 | Hosokawa | 348/581 |

*Primary Examiner*—Sherrie Hsia
*Attorney, Agent, or Firm*—Foley & Lardner

[57] ABSTRACT

A method is provided for reducing or magnifying the picture size of a video composite signal with the use of fewer memories than a conventional video composite signal processor which processes pixel data after being converted into R, G, B signals. A video composite signal is directly converted into digital data and sampled with a sampling frequency of four times the color sub-carrier and stored in a pair of field buffers to be processed for picture size reduction or magnification. The digital data are reduced or multiplied in units of pairs of data with a phase difference of $\pi/2$. Color information is reproduced from corresponding two pairs of data of two adjacent fields having a phase difference of $\pi$.

4 Claims, 6 Drawing Sheets

METHOD OF REDUCING AND MAGNIFYING PICTURE SIZE OF A VIDEO COMPOSITE SIGNAL

This application is a continuation-in-part of U.S. application Ser. No. 08/534,746, filed Sep. 27, 1995, abandoned; which is a continuation of U.S. application Ser. No. 08/262,438 filed Jun. 20, 1994, now abandoned.

BACKGROUND OF THE INVENTION

This invention relates to a method of reducing and magnifying the picture size of a video composite signal.

Figure 2:
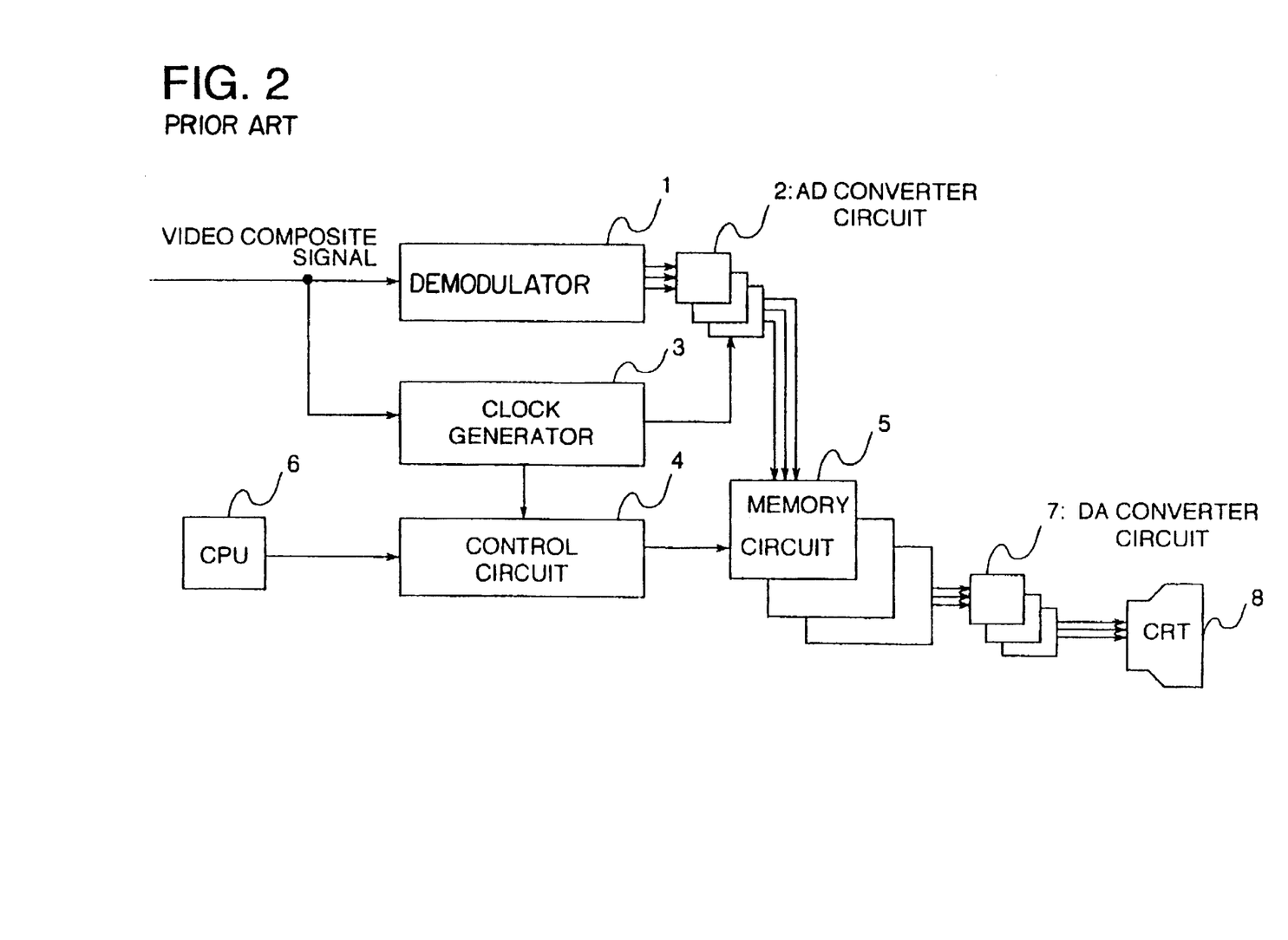
FIG. 2 shows a block diagram of a heretofore known video signal processor for picture size reduction and magnification.

FIG. 2 is a block diagram of a heretofore known video signal processor for reducing or magnifying picture size. A video composite signal in a NTSC modulation system or in a PAL modulation system is demodulated to R, G, B signals or to Y, Cr, Cb signals with a demodulator 1. A synchronous signal generating circuit 3 generates a clock signal of a frequency of n times (n: a positive integer) the color sub-carrier frequency and synchronized with synchronous signals of the video composite signal. An AD (analog to digital) converter circuit 2 converts the R, G, B or Y, Cr, Cb analog signals to digital signals using three AD converters. The digitized R, G, B or Y, Cr, Cb signals are stored in a memory circuit 5 according to addresses generated by the control circuit 4.

By reading-out every pixel data sequentially, a color of picture of the same size as stored is displayed on a CRT 8 through a DA converter circuit 7. By reading-out pixel data from one of every two successive addresses in a line and from one of every two successive lines, a color picture of a half size can be obtained, and contrarily by reading-out pixel data twice in each address in a line and twice in each line, a color picture of a double size can be obtained.

In this way, the picture size can be reduced to 1/N or magnified to N (N being a positive integer) by controlling addresses generated by the control circuit 4 with a CPU 6 for reading-out the memory circuit 5.

Since the pixel data are stored to be processed for size reduction or size magnification in a form of three color signals, that is, R, G, B signals or Y, Cr, Cb signals, the memory circuit 5 in the processor of FIG. 2 needs three sets of memories and three sets of AD and DA (digital to analog) converters, each of the three sets of memories having a capacity for storing one of the three signals for a frame, that is, for two fields of the video signal.

This is a waste of memories and converters.

SUMMARY OF THE INVENTION

Therefore, an important object of this invention is to provide a method of reducing and magnifying picture size of a video composite signal with fewer converters and fewer memories than those needed for storing three color signals.

In order to achieve this object, a composite video signal is directly digitized and stored in this invention instead of three color signals.

The composite video signal is digitized with a sampling frequency of four times, for example, of the color sub-carrier frequency of the video composite signal and stored in two field buffers in a way that data from adjacent lines (interlacing with each other) of two successive fields of the video composite signal sampled at phases different with each other by π of the color sub-carrier phase are stored in the same corresponding addresses of each of the two field buffers.

For size reduction or magnification, data reduction or multiplication in the x-direction is performed in units of pairs of data in two adjacent addresses in each line of a field buffer, that is, in units of pairs of data sampled at phases different by π/2 with each other. For example, when 1/N size picture is to be displayed, data in the last two addresses of every 2N sequential addresses in each line of a field buffer are read-out, and when an N times magnified picture is displayed, data in each two adjacent addresses are read-out N times repeatedly. And, for demodulating color information, data in the same corresponding addresses of the other field buffer are read-out simultaneously.

Data read-out from two field buffers are DA converted separately, and from these data, which are video composite signals sampled at four different phases, 0, π/2, π and 3π/2 of the color sub-carrier, R, G and B signals are reproduced by a demodulator.

In an embodiment of this invention, a pair of line buffers is provided for data buffering in order to store data with a phase difference of π of corresponding lines of the two fields in the same corresponding addresses of the two field buffers. And, when 1/N size picture is to be displayed, data in successive 2N addresses in a line buffer are written N times repeatedly in two same successive addresses of a field buffer and read-out sequentially, instead of reading-out data in the last two addresses of every successive 2N addresses in a field buffer, for a convenience of address control.

Thus, a video signal processor for picture size reduction or magnification is provided with an AD converter, two DA converters and one third of the memories needed for the heretofore known processor of FIG. 2.

BRIEF DESCRIPTION OF THE DRAWINGS

The foregoing, further objects, features, and advantages of this invention will become apparent from a consideration of the following description, the appended claims and the accompanying drawings in which the same numerals indicate the same or the corresponding parts.

DETAILED DESCRIPTION OF THE PREFERRED EMBODIMENTS

Figure 1:
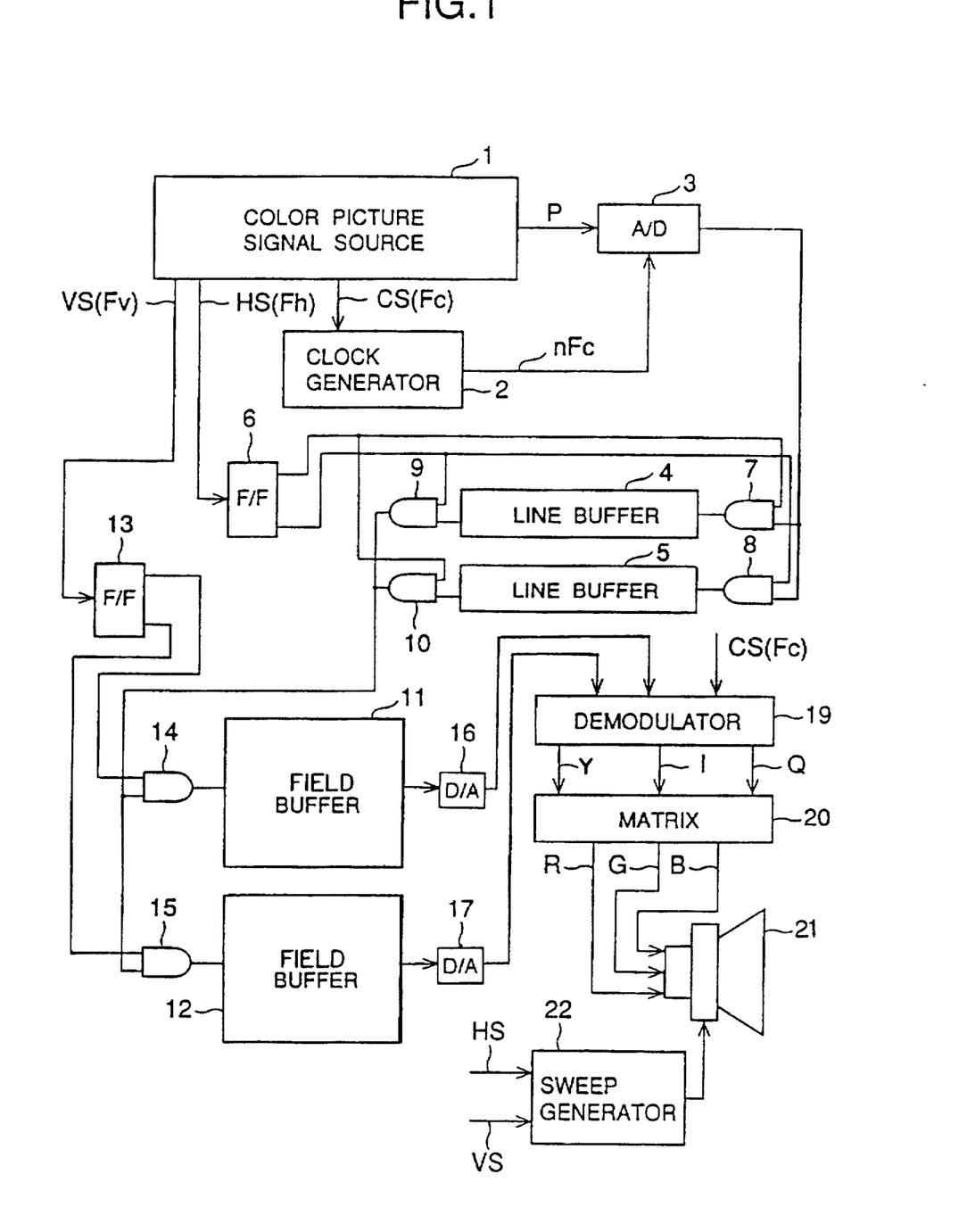
FIG. 1 shows a block diagram of an embodiment of this invention.

Referring to FIG. 1, suppose that a color picture signal source 1 delivers a color sub-carrier CS of frequency Fc, a horizontal synchronous signal HS, a vertical synchronous signal VS and a composite video signal P of an NTSC system represented by an equation, $$P = Y + I \sin 2\pi F c \cdot t + Q \sin 2\pi F c \cdot t \qquad (1)$$

where Y (luminance component), I (in-phase component) and Q (quadrature component) are linear functions of R, G and B signals and Y denotes brightness of a color pixel, and I and Q represent color components at phase $\pi$ and at phase 0 respectively of the color sub-carrier CS.

The signals HS and VS are rectangular pulse signals and the signal HS is at logic OFF for every horizontal blanking interval and the signal VS is at logic OFF for every vertical blanking interval of the signal P.

A clock generator 2 generates a clock signal CK of frequency 4×Fc phase locked to the signal CS. The signal P is digitized by an AD converter 3, sampled according to the clock signal CK at phases 0, $\pi/2$, $\pi$ and $3\pi/2$ of the color sub-carrier CS.

There is provided a pair of line buffers 4 and 5 and a pair of field buffers 11 and 12.

Output logic of a flip-flop 6 is changed at each rising edge of the signal HS. While a gate 7 passes the output of the AD converter 3 for writing the line buffer 4, a gate 10 passes the signal read-out from the line buffer 5 to be written to one of the field buffers. In a next horizontal sweep cycle, the output of the AD converter 3 is written in the line buffer 5 through a gate 8, while contents of the line buffer 4 is read-out through a gate 9.

Since the phase angle of the color sub-carrier becomes 0 or $\pi$ alternately at the beginning of each horizontal line, one of the pair of line buffers, the line buffer 4 for example, stores a train of sampled data beginning with P(0) (hereafter a line beginning with P(0) is called an even line) and the other line buffer, or the line buffer 5, stores a train of sampled data beginning with P($\pi$) (hereafter a line beginning with P($\pi$) is called an odd line), where P($\chi$) means digitized data at a phase angle $\chi$ of the color sub-carrier.

Field buffers 11 and 12 are alternately written according to a signal VS, with sampled data read-out from the line buffers. Output logic of a flip-flop 13 is changed at each rising edge of the signal VS, and gates 14 and 15 control writing of the two field buffers according to the output logic of the flip-flop 13. Here, suppose that the field buffer 11 stores sampled data of a field beginning at the upper left of a picture frame (hereafter called a first field) and the field buffer 12 stores another field beginning at the upper middle of the picture frame (hereafter called a second field).

In a frame composed of a first field and a second field, the first field and the second field have same line phases, that is, when the first line of the first field is an even line, the first line (or the leading half line beginning at the upper middle of the second field) is also a part of an even line. And line phases of successive two frames differ by $\pi$ with each other, that is, a frame which begins with an even line (hereafter called an even frame) is succeeded by a frame beginning with an odd line (hereafter called an odd frame).

Returning to FIG. 1, sampled data stored in these two field buffers are read-out simultaneously and converted separately to analog signals by DA converters 16 and 17. The output of the DA converters 16 and 17 are demodulated at a demodulator 19. The demodulated signals which correspond to signal Y, I and Q in the equation (1) are converted to three color intensity components R, G, B by an ordinary matrix 20 and are supplied to a CRT 21.

The line buffers 4 and 5 and the field buffers 11 and 12 are made of RAM, and for writing and reading of these buffer memories, address signals must be delivered for indicating where to write or where to read.

In the apparatus of FIG. 1, the line buffers and field buffers are written of read-out synchronized with the clock signal CK. Addresses have binary numbers, but in the following paragraphs they are described by digits and assumed to begin from 0.

The composite video signal P is composed of three components Y, Q and I as shown by equation (1). So, at least three data sampled at different phases are necessary for reproducing the three components for a color pixel when sampling phases are known. Therefore, both for reducing or magnifying the picture size, data should be reduced or multiplied retaining at least three data of different phases for a color pixel. Furthermore, by the reduction or the multiplication, the order of data-train is rearranged, and therefore a conventional technique such as the analog detection using the color sub-carrier CS synchronized with color burst signals or the comparison with preceding line data can not be used.

In the embodiment, sampled data are treated in units of P(0) and P($\pi/2$) or P($\pi$) and P($3\pi/2$), and comparison for the demodulation of color signals is made between corresponding data of adjacent two fields, for this reason.

Figure 3:
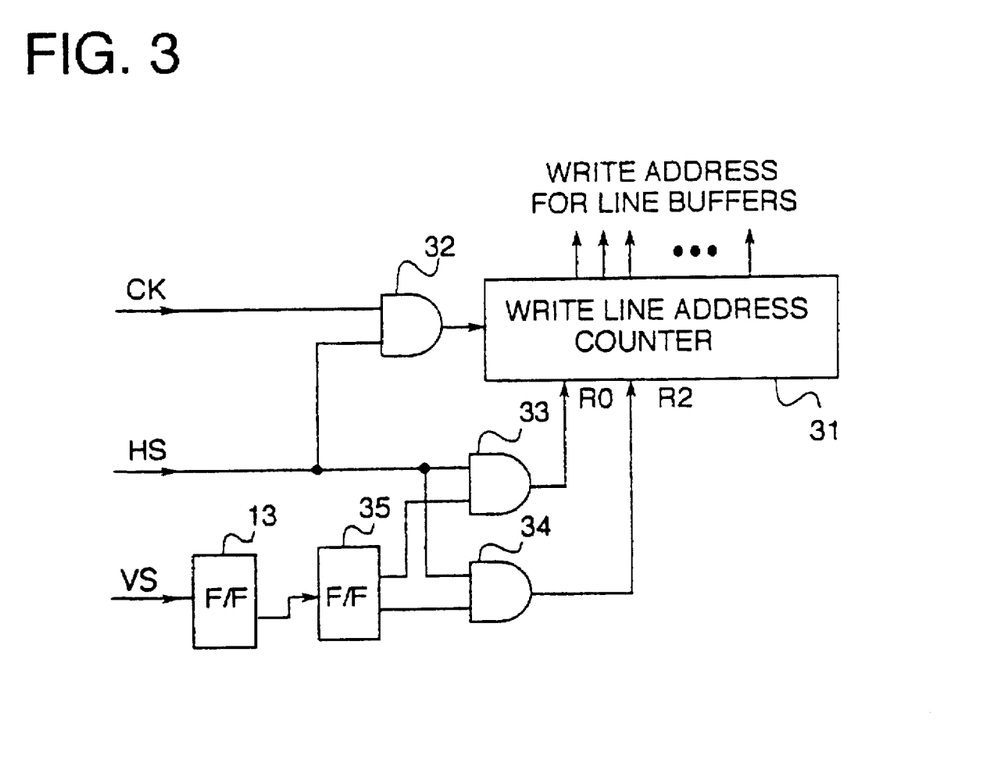
FIG. 3 shows a block diagram of a write address generator of the embodiment of FIG. 1.

FIG. 3 shows an example of a circuit for generating write address signals for the line buffers 4 and 5. The write addresses are generated by a write line address counter 31, which is reset by each rising edge of the signal HS through a gate 33 or a gate 34 and counts the clock signal CK through a gate 32 while the signal HS is at logic ON, and are delivered to one of the line buffers through the gate 7 or 8.

So, even lines are always written in particular one of the line buffers and odd lines are written in the other line buffer as described. In a vertical blank interval, the write line address counter 31 repeats counting and the flip-flop 6 repeats changing status, and the leading half line of a second field is written in the latter half of the same line buffer that is used to store the ending half line of the preceding first field in the first half thereof.

Figure 4:
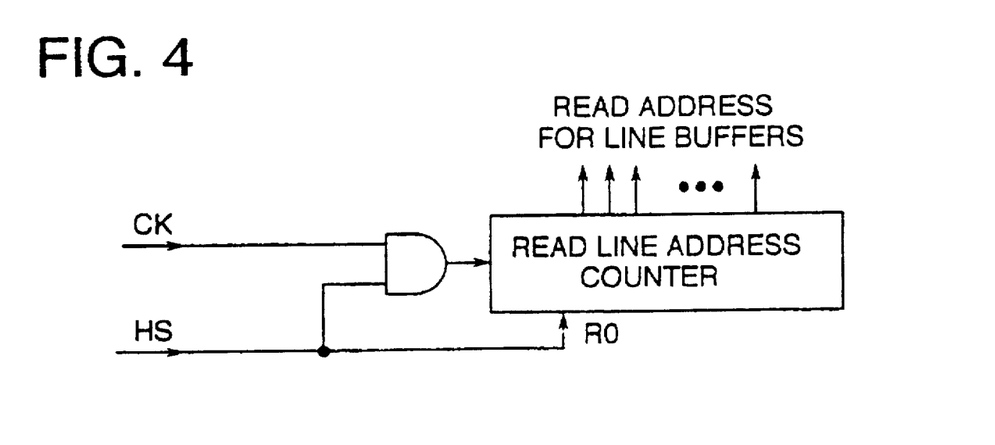
FIG. 4 shows a block diagram of a read address generator of the embodiment of FIG. 1.

Here, it is noted that the write line address counter 31 is reset to 0 when data of first fields of even frames or second fields of odd frames are written and is reset to 2 when data of second fields of even frames or first fields of odd frames are written, for color information processing described in a later paragraph. So, line data of second fields of even frames, for example, are written at addresses beginning from 2, as 2, 3, 4, . . . Read addresses for the line buffers are generated by a read line address counter shown in FIG. 4 which counts the clock signal CK when the signal HS is at logic ON, being reset to 0 by each rising edge of the signal HS.

In the embodiment of the present invention, a picture size is reduced or magnified. For reducing picture size, data are to be omitted at a certain interval. For this purpose, write addresses for the field buffers are generated by a first x-address generator and a first y-address generator.

Figure 5:
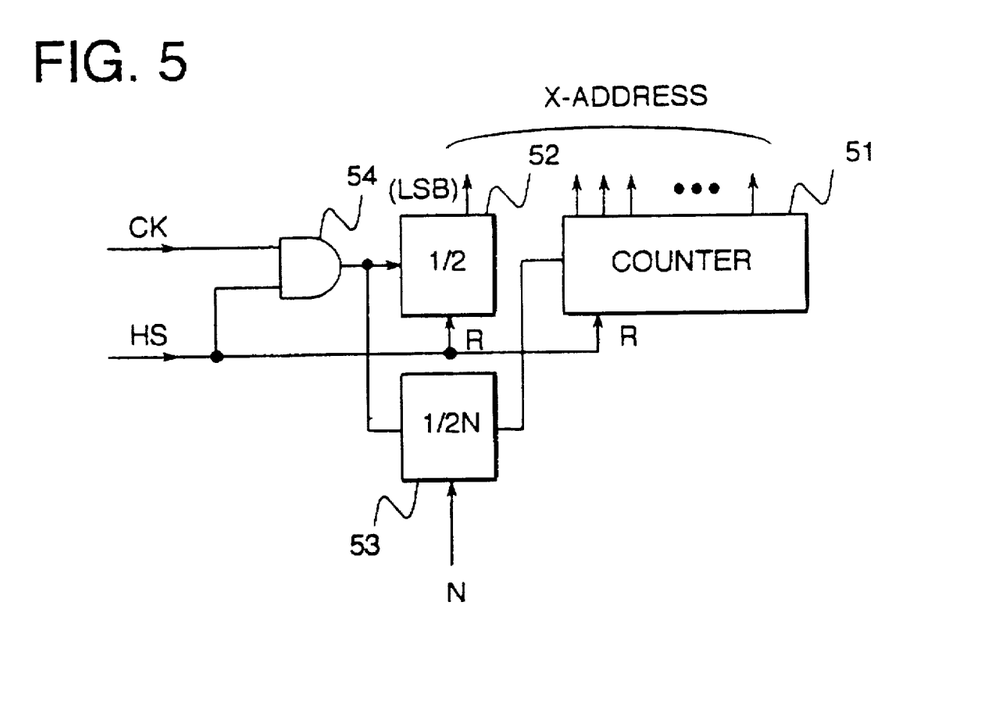
FIG. 5 shows a block diagram of an x-address generator of the embodiment of FIG. 1.

FIG. 5 is a block diagram of the first x-address generator. The least significant bit (LSB) of the address is obtained from the output of a one-stage binary counter 52 which counts the clock signal CK through a gate 54, and other higher bits are obtained from the output of a counter 51 which counts the output of a ½N frequency divider 53 which frequency-divides the clock signal CK through the gate 54 by 2N. When N=1, the first x-address generator of FIG. 5 outputs addresses sequentially, as 0, 1, 2, 3, . . . , but when N=2, the first x-address generator outputs addresses as 0, 1, 0, 1, 2, 3, 2, 3, . . . , 2i, 2i+1, 2i, 2i+1, 2(i+1), 2(i+1)+1, 2(i+1), 2(i+1)+1, . . . In the same way, when N=n, a pair of addresses 2i and 2i+1 are repeated n times (i=0, 1, 2, . . . ).

In case of reduction, the ½N frequency divider 53 of the first x-address generator of FIG. 5 is controlled with N=n for reducing the picture size to 1/n. When N=2, for example, data at addresses 2i and 2i+1 in the line buffer 4 or 5 are once written at x-addresses i and i+1 in a line of the field buffer, but just after that, data at addresses 2(i+1) and 2(i+1)+1 in the line buffer are over-written on the same addresses of the field buffer. Thus, ½ reduced data in x-direction are written on the line. In the same way, when N=n, adjacent two addresses are re-written n times and 1/n reduced data in x-direction are prepared.

Figure 6:
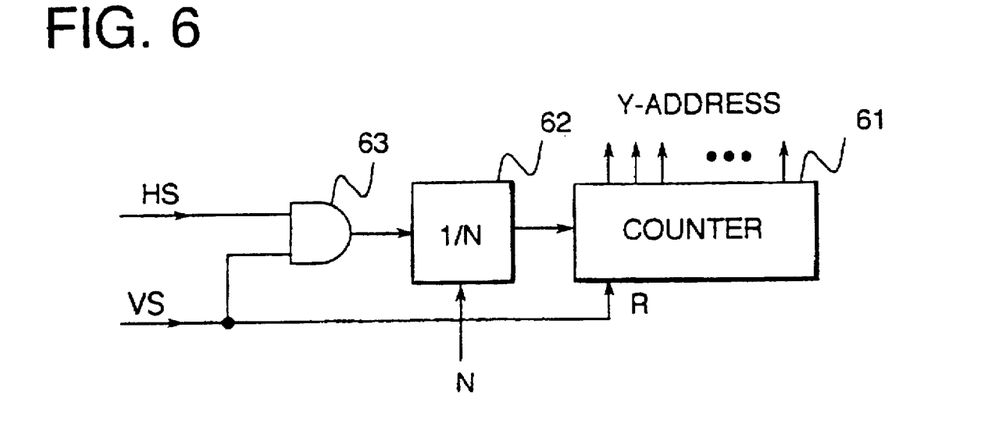
FIG. 6 shows a block diagram of a y-address generator of the embodiment of FIG. 1.

As for the y-addresses for writing data in the field buffer 11 or 12, a first y-address generator shown in FIG. 6 is used. A gate 63 passes the signal HS while the signal VS is at logic ON and a frequency divider 62 divides the output of the gate 63 by N. A counter 61 is reset at every rising edge of the signal VS and counts the output of the frequency divider 62. When N=1, the y-address for writing is incremented at every rising edge of the signal HS, and all lines of the field buffer 11 or 12 are written sequentially with the data from the line buffers 4 and 5. But, when N=2, same line in the field buffer is re-written 2 times and each (2n+1)-th line of the original signal is written in each n-th line of the field buffer (n=0, 1, . . . ). In the same way, by controlling the first y-address generator with N=n, each line of the field buffer stores every n-th line of an original field.

Thus, 1/n xy-reduced date composed of units of P(0) and P($\pi$/2) or units of P($\pi$) and P(3$\pi$/2) can be prepared in the two field buffers 11 and 12.

For reading field buffers, x-addresses and y-addresses are generated by a second x-address generator and a second y-address generator having the same contrivance with the first x-address generator of FIG. 5 and the first y-address generator of FIG. 6 respectively. In case of size reduction, however, the second x-address generator and the second y-address generator are both controlled with N=1 and generate addresses sequentially.

Here, the second x-address generator and the second y-address generator are controlled with the horizontal and the vertical signal for controlling a sweep generator 22 and so on of FIG. 1, but they are described as the signals HS and VS in the following paragraphs, since they may be synchronized with the signals HS and VS.

For magnifying the picture size n times, data must be multiplied. For writing the field buffers, the first x-address generator of FIG. 5 and the first y-address generator of FIG. 6 are both controlled with N=1, and all data in a line buffer are written sequentially in corresponding x-addresses of a line of the field buffers and all lines of the field buffers are written sequentially. To the contrary, the second x-address generator and the second y-address generator are both controlled with N=n, and the second x-address generator generates same sequential two addresses n times repeatedly. So, each unit of data in two adjacent addresses in a line of the field buffers are read-out n times repeatedly and each line of the field buffers are read-out n times repeatedly, producing n times xy-magnified sequential data composed of pairs of data of P(0) and P($\pi$/2) or P($\pi$) and P(3$\pi$/2) for displaying an n times magnified picture.

Figure 7:
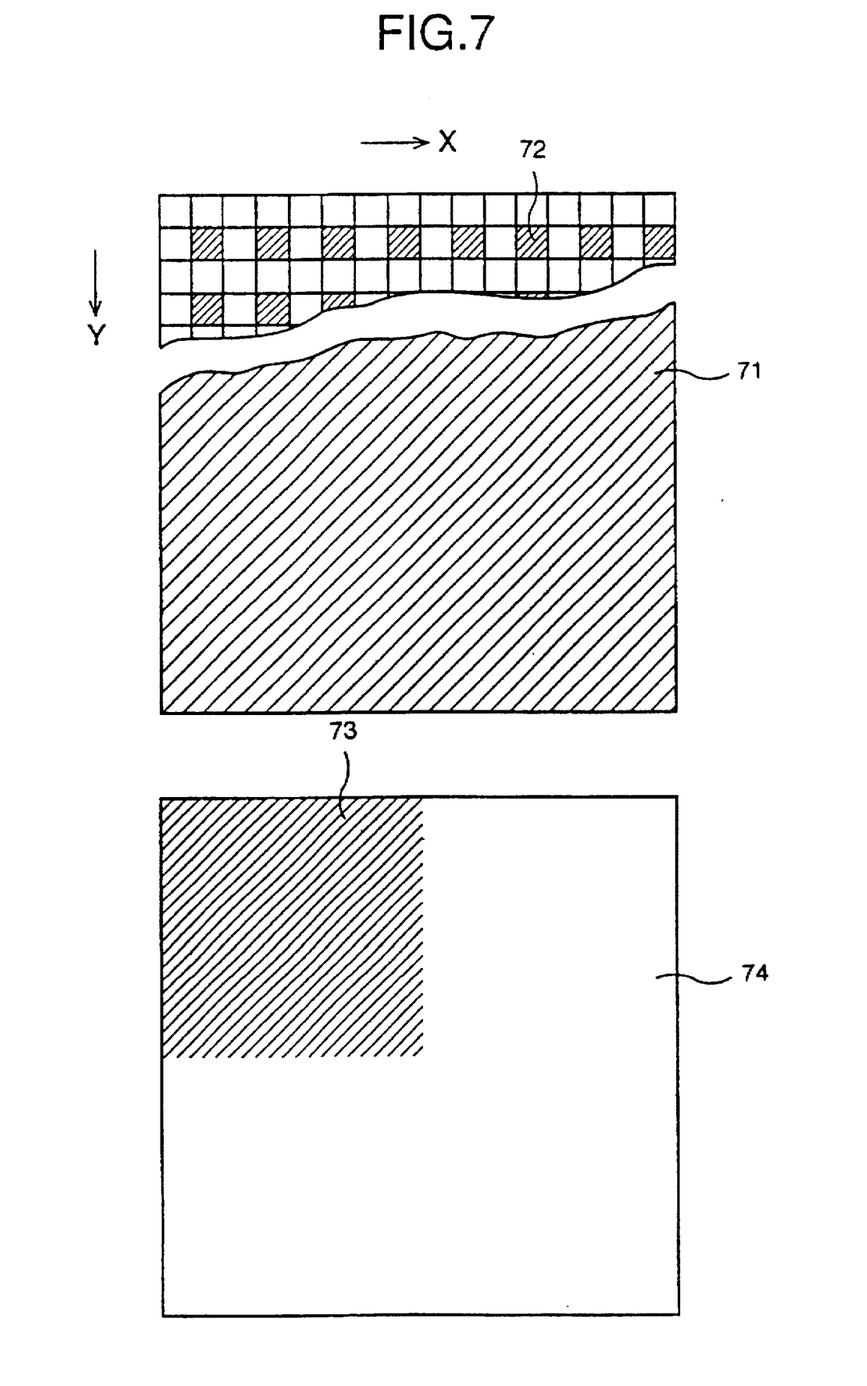
FIG. 7 illustrates size reduction and magnification in the embodiment of FIG. 1.

FIG. 7 shows an example of size reduction or magnification. A grid 72 shows a pair of data in two adjacent addresses in a line buffer. When the picture size is reduced to ½, only shaded data at odd numbered grids and odd numbered lines of the original data 71 are read-out from the field buffers to be displayed in a reduced area 73. Conversely, when a picture size is magnified by 2, the data of an area 73 of a picture 74 is read-out to be displayed as 71.

Figure 8:
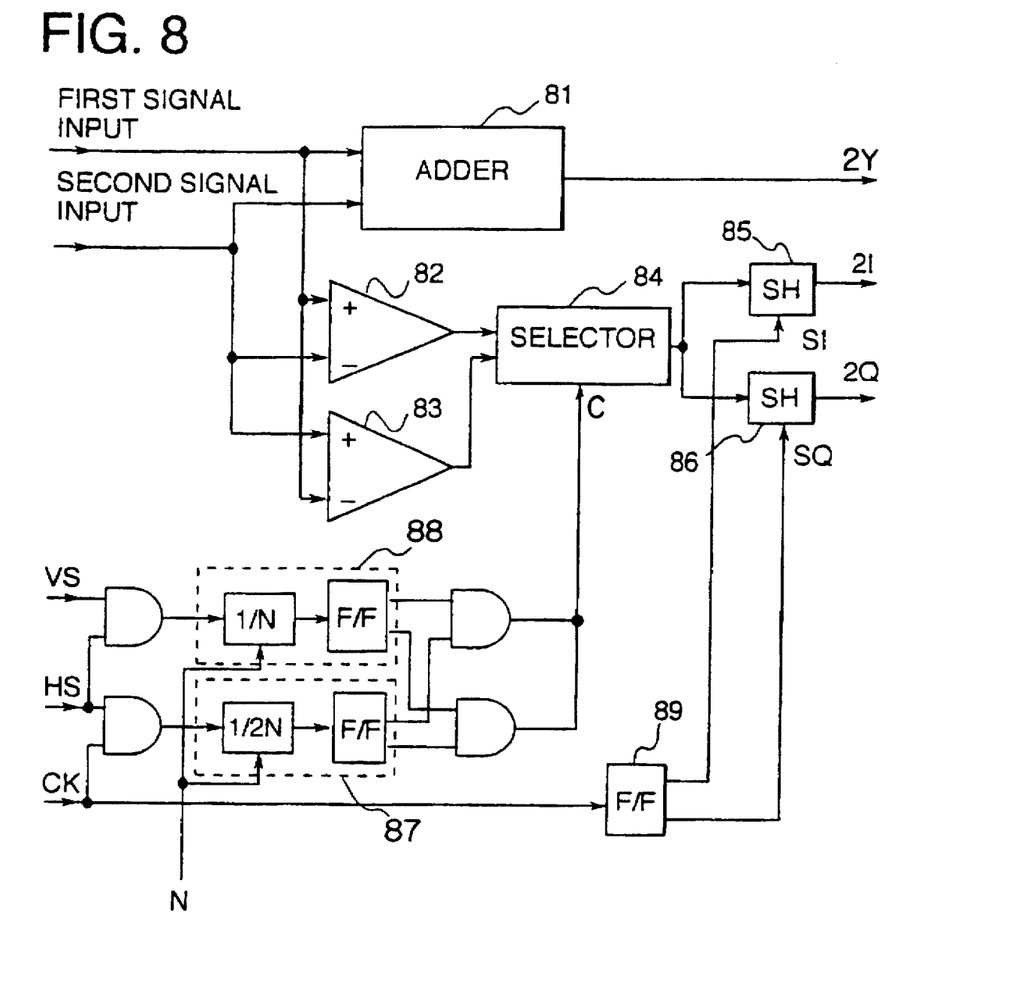
FIG. 8 shows a block diagram of a demodulator of the embodiment of FIG. 1.

Below, the processing in a demodulator 19 will be described.

For demodulating composite video signals, data stored in the same address for both of the field buffers 11 and 12 are read-out simultaneously.

As the data are sampled by the clock signal CK of the frequency of 4×Fc synchronized with the color sub-carrier and stored as above described, sampled data in every corresponding address of the two field buffers have phase difference of $\pi$ with each other.

First, when the picture size is neither reduced nor magnified will be described.

In an even frame, the first lines of the field buffer 11 and 12 are both even lines, the second lines are both odd lines and so on, but in the field buffer 12 the lines are stored in addresses shifted by two in the x-direction, because the write line address counter 31 is reset to 2 when second fields of even frames are written in line buffers 4 and 5. So, data in a same address have a phase difference of $\pi$. In an odd frame, the first lines are odd lines, but in turn, lines in the buffer 11 are stored in addresses shifted by two and the phase difference between data in same corresponding addresses is also $\pi$. And, between adjacent two frames, line phases being different from each other, data stored in an address of the field buffer 11 or 12 have nevertheless always same phase angle, because lines are stored in addresses shifted by two in second fields of even frames and first fields of odd frames.

When data reduction or data multiplication is performed for reducing or magnifying the picture size, the reduction or the multiplication is executed in a same way both in the field buffer 11 and in the field buffer 12. Therefore, the difference between phases of data in same corresponding addresses of the two field buffers remains always $\pi$.

For displaying the data thus prepared, data in same addresses in the field buffers 11 and 12 are read-out simultaneously using the x-address generated by the second x-address generator and the y-address generated by the second y-address generator as above described. These data are converted to analog signals by the DA converters 16 and 17 separately and delivered to a first signal input and to a second signal input of the demodulator 19 respectively.

FIG. 8 shows a block diagram of the demodulator 19.

Signals $P_1(i)$ and signals $P_2(i+\pi)$ converted from data read-out from the field buffer 11 and the field buffer 12 respectively are input to a first analog adder 81, where i denotes the sampling phase angle of the signal CS.

Y component of the composite video signal P of the equation (1) is obtained as an output of the first analog adder 81 as following, $$P_1(i) = Y_1 + I_1 \sin(i) + Q_1 \cos(i)$$
$$P_2(i + \pi) = Y_2 + I_2 \sin(i + \pi) + Q_2 \cos(i + \pi)$$
$$P_1(i) + P_2(i + \pi) \approx 2Y$$

when $Y_1 \approx Y_2 \approx Y$, $I_1 \approx I_2$ and $Q_1 \approx Q_2$.

Since data are reduced or multiplied cyclically with a pair of P(0) and P($\pi$/2) or a pair of P($\pi$) and P(3$\pi$/2), when the picture size is reduced by ½n (n=1, 2, . . . ), data in the field buffer 11 or a first field are all composed of the pair of $P_1(\pi)$ and $P_1(3\pi/2)$ and data in the field 12 are composed of the pair of $P_2(0)$ and $P_2(\pi/2)$. And when the picture size is reduced by 1/(2n−1), data are composed of series of P(0), P($\pi$/2), P($\pi$) and P(3$\pi$/2), beginning with P(0) in lines of even y-address and with P($\pi$) in lines of odd y-address of the field buffer 11, and the phase angle of data train in the field buffer 12 differs by $\pi$ with that of the field buffer 11.

When the picture size is multiplied by n, the first line of the field buffer 11 or a first field begins with a train of n times of the pair of P(0) and P($\pi$/2) and n lines of same phase succeed consecutively, followed by n lines beginning with a train of n times of the unit of P($\pi$) and P(3$\pi$/2). And, in the field buffer 12, data are arranged in the reverse order.

Returning to FIG. 8, the demodulator 19 comprises a first analog subtracter 82 and a second analog subtracter 83. The first signal input is connected to a positive input of the first analog subtracter 82 and a negative input of the second analog subtracter 83 and the second signal input is connected to the other input terminals of the first and second subtracters 82 and 83. So, the first analog subtracter 82 outputs $P_1(i)-P_2(i+\pi)$ and the second analog subtracter 83 outputs $P_2(i+\pi)-P_1(i)$, where $P_1(\chi)$ and $P_2(\chi)$ denote the data of the first and the second signal inputs respectively.

A selector 84 selects and outputs the output of the first analog subtracter 82 when a control signal C is at logic OFF and the output of the second analog subtracter 83 when the control signal C is at logic ON.

The control signal C is obtained by frequency dividing the clock signal CK with a ¼N frequency divider 87 and inverted when an output of a ½N frequency divider 88, which frequency-divides the signal HS, is at logic ON. The ¼N frequency divider 87 generates a rectangular pulse signal by frequency-dividing the clock signal CK by 4n, when controlled with N=n, synchronized with the signal HS. That is, the output of the ¼N frequency divider is at logic OFF at a rising edge of the signal HS and changes its logic at every (4n+1)-th rising edge of the signal CK. Similarly, the ½N frequency divider 88 generates a rectangular pulse signal by frequency dividing the signal HS by n, when controlled with N=n, synchronized with the signal VS. And, the outputs of the ¼N frequency divider 87 and the ½N frequency divider 88 both remain at logic OFF when controlled with N=0.

As the control signal C is thus prepared, by controlling the demodulator 19 with N=1 when the picture size is neither reduced nor magnified, the selector 84 outputs a train of signals $(P_1(0)-P_2(\pi))$, $(P_2(\pi/2)-P_1(3\pi/2))$, $-(P_1(\pi)-P_2(0)$, $-(P_1(3\pi/2)-P_2(\pi/2))$, . . . , that is, a train of signals 2Q, 1I, 2Q, 2I, . . . , beginning with 2Q at beginnings of every horizontal line.

When the picture size is reduced to 1/(2n+1), the demodulator 19 is controlled also with N=1 and the selector 84 outputs also a train of signals 2Q, 2I, 2Q, 2I, . . . , beginning with 2Q at beginnings of every horizontal line. The demodulator 19 is controlled with N=0 when the picture size is reduced to ½n, and with N=n when the picture size is multiplied by n, and the selector 84 outputs equally a train of signals 2Q, 2I, 2Q, 2I, . . . , beginning with 2Q at beginnings of every horizontal line.

A first sample-hold 85 and a second sample-hold 86 sample-hold the output of the selector 84 and outputs signals 2I and 2Q respectively in accordance with sampling signal SI and SQ generated with a flip-flop 89 from the clock signal CK.

Returning to FIG. 1, the Y, I and Q components thus obtained are supplied to the ordinary matrix 20 for generating R, G, B signals to be displayed on the CRT 21.

In this way, picture size reduction or magnification is performed in the embodiment.

As heretofore described, a picture size reduction or magnification can be processed with about ⅓ memory space with about ⅓ the circuitry by processing a video signal in a form of sampled composite signals in the embodiment of this invention, than in the prior art which perform signal processing after demodulation to R, G, B signals.

Although only a preferred embodiment has been described, it is apparent that there are many modifications without departing from the scope of the invention.

For example, the demodulator 19 demodulates color components from analog signals converted by the DA converters 16 and 17 in the embodiment, but a digital demodulator can be used, which processes the digital data read-out from the field buffers 11 and 12 with the same logic as that of the demodulator 19 and the ordinary matrix 20 for generating R, G and B signals directly.

Further, the demodulator 19 of the embodiment comprises the selector 84 to arrange polarity of the I and Q components according to the data arrangement, but when the AD converter 3 generates digital data of a video composite signal together with sampling phase information to be stored in the field buffers 11 and 12, a digital demodulator can discriminate the sampling phase of the read-out data without information of the data arrangement for demodulating color components.

And further, the picture is described to be reduced or multiplied by n (n being a positive integer), but when a digital demodulator as described is used, it can be reduced or multiplied by n/m (n, m being positive integers and n>m) by controlling the the ½N frequency divider 53 of FIG. 5 and the 1/N frequency divider 62 of FIG. 6 with N=n/m, that is, to generate a pulse signals wherein n−m pulses are masked in a interval of n periods.

And further, the picture is described to be reduced or multiplied with the origin of its coordinates remaining at its upper left corner, but any part of the original picture can be reduced or multiplied and displayed at any part of the display 21, by controlling each of the initial values and the maximum values of the first x-address counter, the second x-address counter, the first y-address counter and the second y-address counter.

And further, the embodiment is described assuming that the video composite signal is that of an NTSC system, but a video composite signal of a PAL system can be processed in the same scope of the invention. In a PAL system for example, a frame has phase difference of $3\pi/2$ from its preceding frame and every fourth frame has a same phase of color components.

Therefore, the write line address counter 31 of FIG. 3 is modified to be reset to −1 with every rising edge of the signal HS when second fields of first frames and first fields of second frames are written in line buffers 4 and 5, reset to 1 when first fields of fourth frames and second fields of third frames are written, and reset to 2 when first fields of third frames and second fields of second frames are written. By thus shifting the writing addresses of line buffers, the phase differences between data in the same corresponding addresses of the field buffers 11 and 12 can be maintained always with a fixed angle and data can be processed for size reduction or magnification in the same way as the video composite signal of an NTSC system.

What is claimed is:

1. A method of reducing and magnifying picture size of a video composite signal composed of data of a sequence of fields having a sequence of lines and modulated with a color sub-carrier; comprising:

a step of sampling and A/D converting the video composite signal in synchronization with a clock signal, the clock signal having a frequency of four times the frequency of, and being synchronized with, the color sub-carrier, wherein the video composite signal is converted into digital data composed of a sequence of pairs of data, each of said pairs of data being one of an even pair of data sampled at phases of the color sub-carrier shifted by 0 and $\pi/2$ from a base phase and an odd pair of data sampled at phases of the color sub-carrier shifted by $\pi$ and $3\pi/2$ from said base phase;

a step of buffering said digital data with a first field buffer and a second field buffer for obtaining first and second display data, said first display data being composed of data read out synchronously with synchronous signals for displaying a picture from said first and said second field buffers storing said digital data, wherein data of certain lines of each field and certain pairs of data of each line of said digital data are subtracted when the picture size is reduced, and data of certain lines of each field and certain pairs of data of each line of said digital data are repeated a predetermined number of times when the picture size is magnified, and said second display data being composed of a display sequence of pairs of data, wherein each even pair of data of said display sequence of pairs of data are read out simultaneously with a corresponding odd pair of data of said first display data from said first and said second field buffers storing said digital data of one of adjacent fields of said corresponding odd pair of data, and each odd pair of data of said display sequence of pairs of data are read out simultaneously with a corresponding even pair of data of said first display data from said first and said second field buffers storing said digital data of one of adjacent fields of said corresponding even pair of data; and a step of demodulating and D/A converting a sequence of ensembles of the even and the odd pair of data of said first and said second display data simultaneously read out into R, G and B signals for displaying the picture.

2. A method of reducing and magnifying picture size of a video composite signal composed of data of a sequence of fields having a sequence of lines and modulated with a color sub-carrier, as recited in claim 1, wherein:

the video composite signal is modulated according to an NTSC system and is composed of sequences of data of an even and an odd frame, said even frame being composed of a first field beginning at 0 phase of the color-sub carrier and a second field, and said odd frame being composed of a first field beginning at π phase of the color sub-carrier and a second field; and said step of buffering said digital data comprises, a step of storing said digital data in each of a pair of line buffers alternately, each of said line buffers having a plurality of sequential binary addresses for storing and reading digital data, wherein each of said pair of line buffers store said digital data of a line sequentially, beginning with the lowest binary address, when said line is one of lines of the first field of the even frame or the second field of the odd frame, and store said digital data of a line sequentially, beginning with the third lowest binary address, when said line is one of lines of the second field of the even frame or the first field of the odd frame, a step of reading out said digital data sequentially from the first address of each of said pair of line buffers alternately, a step of writing said digital data read out from said pair of line buffers in said first field buffer when said digital data are data of the first fields and in said second field buffer when said digital data are data of the second fields, said digital data being written sequentially when the picture size is not reduced, and the data of certain lines of each field and the certain pairs of data of each line of said digital data being over written the predetermined number of times in same addresses when the picture size is reduced;

a step of reading out said digital data from both of said first and said second field buffers simultaneously for obtaining said first and said second display data, said digital data being read out sequentially from addresses corresponding to each other of both of said first and said second field buffers when the picture size is not magnified, and the data of certain lines of each field and the certain pair of data of each line of said digital data being read out repeatedly the predetermined number of times from said addresses corresponding to each other of both of said first and said second field buffers when the picture size is magnified.

3. A method of reducing and magnifying picture size of a video composite signal composed of data of a sequence of fields having a sequence of lines and modulated with a color sub-carrier, as recited in claim 1; wherein:

said step of sampling and A/D converting the video composite signal comprises a step of adding a bit to each of said pairs of data of said digital data, said bit indicating whether said each of said pairs of data is the even pair of data or the odd pair of data;

said step of demodulating and D/A converting demodulates said sequence of ensembles of the even and the odd pairs of data of said first and said second display data simultaneously read out referring to said bit of each of said even and said odd pairs of data.

4. An apparatus for reducing and magnifying picture size of a video composite signal modulated with a color sub-carrier according to an NTSC system composed of sequences of data of an even and an odd frame, said even frame composed of a first field beginning at 0 phase of the color sub-carrier and a second field, and said odd frame composed of a first field beginning at π phase of the color sub-carrier and a second field; comprising:

a video composite signal source for delivering the video composite signal, the color sub-carrier, and vertical and horizontal synchronous signals of the video composite signal, said vertical and said horizontal synchronous signals being rectangular pulse signals at logic OFF for every respective vertical and horizontal blanking interval;

a clock generator for generating a clock signal having a frequency of four times the frequency of, and synchronized with, the color sub-carrier;

an A/D converter for sampling the video composite signal in synchronization with said clock signal, and converting the video composite signal into digital data composed of a sequence of pairs of data, each of said pairs of data being one of an even pair of data sampled at 0 phase and π/2 phase of the color sub-carrier and an odd pair of data sampled at π phase and 3π/2 phase of the color sub-carrier;

means for storing said digital data in each of a pair of line buffers alternately according to output logic of a first flip-flop driven by said horizontal synchronous signal, each of said pair of line buffers storing said digital data of a line sequentially in addresses indicated by a write line address counter which counts said clock signal when said horizontal synchronous signal is at logic ON and is reset by each rising edge of said horizontal synchronous signal, said write line address counter being reset to 0 when said digital data are data of the first field of the even frame or the second field of the odd frame, and is reset to 2 when said digital data are data of the second field of the even frame or the first field of the odd frame;

means for reading out said digital data sequentially from addresses indicated by a read line address counter of each of said pair of line buffers alternately according to inverse logic of said first flip-flop, said read line address counter counting said clock signal when said horizontal synchronous signal is at logic ON and reset to 0 by each rising edge of said horizontal synchronous signal;

means for writing said digital data read out from said pair of line buffers in each of a first field buffer and a second field buffer alternately in addresses indicated by a first x-address generator and a first y-address generator according to output logic of a second flip-flop driven by said vertical synchronous signal delayed by one period of said horizontal synchronous signal, said first x-address generator generating write x-addresses reset to an initial write x-address indicated by a control means by every rising edge of said horizontal synchronous signal wherein the least significant bit of each of said write x-addresses is output from an one stage binary counter counting said clock signal while said horizontal synchronous signal is at logic ON and the other higher bits of each of said write x-addresses are output from a counter counting output of a first variable frequency divider which frequency-divides said clock signal delivered while said horizontal signal is at logic ON by 2N, and said first y-address generator generating write y-addresses reset to an initial write y-address indicated by said control means by every rising edge of said vertical synchronous signal delayed and increasing in accordance with output of a second variable frequency divider which frequency-divides said horizontal synchronous signal delivered while said vertical synchronous signal delayed is at logic ON by N, where N is a positive integer indicated by said control means and is 1 when the picture size is not reduced and is n when the picture size is reduced to 1/n, n being a positive integer;

means for generating a second vertical synchronous signal and a second horizontal synchronous signal for displaying a picture;

means for generating first and second display data by reading out simultaneously said digital data stored in both of said first and said second field buffers respectively from same addresses indicated by a second x-address generator and a second y-address generator, said second x-address generator generating read x-addresses reset to an initial read x-address indicated by said control means by every rising edge of said second horizontal synchronous signal wherein the least significant bit of each of said read x-addresses is output from an one stage binary counter counting said clock signal while said second horizontal synchronous signal is at logic ON and the other higher bits of each of said read x-addresses are output from a counter counting output of a third variable frequency divider which frequency-divides said clock signal delivered while said second horizontal signal is at logic ON by 2M, and said second y-address counter generating read y-addresses reset to an initial read y-address indicated by said control means by every rising edge of said second vertical synchronous signal and increasing in accordance with output of a fourth variable frequency divider which frequency-divides said second horizontal synchronous signal delivered while said second vertical synchronous signal is at logic ON by M, where M is a positive integer indicated by said control means and is 1 when the picture size is not magnified and is m when the picture size is magnified by m, m being a positive integer;

a first D/A converter and a second D/A converter for converting said first and said second display data to a first analog signal and a second analog signal respectively;

a demodulator for demodulating said first and said second analog signals into a luminance component, an in-phase component and a quadrature component of color signals for displaying said picture, having, an analog adder for obtaining said luminance component by adding said first and said second analog signals, a first analog subtracter which subtracts said second analog signal from said first analog signal, a second analog subtracter which subtracts said first analog signal from said second analog signal, a selector which selects and outputs an output of said first analog subtracter when a control signal is at logic ON and an output of said second analog subtracter when said control signal is at logic OFF, said control signal being controlled at logic OFF when the picture size is reduced to 1/2n, n being a positive integer, by said control means, a fifth variable frequency divider and a sixth variable frequency divider, controlled by said control means, for generating said control signal when the picture size is reduced to 1/(2n+1), n being a positive integer not less than 0, and when the picture size is not reduced, said fifth variable frequency divider frequency-dividing said clock signal delivered while said second horizontal synchronous signal is at logic ON by 4×N, and said sixth variable frequency divider frequency-dividing said second horizontal synchronous signal delivered while said second vertical synchronous signal is at logic ON by 2×N, and said control signal being obtained from an output of said fifth variable frequency divider inverted while an output of said sixth variable frequency divider is at logic ON, where N is a positive integer indicated by said control means and is 1, when the picture size is reduced to 1/(2n+1), and is m when the picture size is magnified by m;

a first sample hold sampling said output of said selector for holding and outputting said in-phase component according to output logic of a third flip-flop driven by said clock signal, and a second sample hold sampling said output of said selector for holding and outputting said quadrature component according to inverse logic of said third flip-flop;

a matrix circuit for generating R, G and B signals from said luminance, said in-phase and said quadrature components; and a display supplied with said R, G and B signals and controlled by a sweep generator synchronized with said second vertical synchronous signal and said second horizontal synchronous signal.

* * * * *